Jan. 8, 1929.

M. S. BLACKBURN

SINGLETREE

Filed Dec. 10, 1927

1,697,901

INVENTOR.

MONROE S. BLACKBURN,

BY

ATTORNEY.

Patented Jan. 8, 1929.

UNITED STATES PATENT OFFICE.

MONROE S. BLACKBURN, OF ATHENS, ALABAMA.

SINGLETREE.

Application filed December 10, 1927. Serial No. 239,184.

My invention relates to improvements in single trees.

In accordance with my invention, I provide a single tree element, upon which the trace-hooks are directly pivotally mounted. Means are provided whereby the trace-hooks remain closed, when the pull is applied thereto from the traces, whereby the traces will not become detached from the trace-hooks. The construction is such that the trace-hooks may be properly shifted to an open position, to permit of the separation therefrom of the traces. The trace-hooks are provided with stop fingers or extensions, arranged to directly engage with the single tree to limit the opening movement of the trace hooks.

In the accompanying drawings, forming a part of this specification, and in which like numerals are employed to designate like parts throughout the same.

Figure 1:
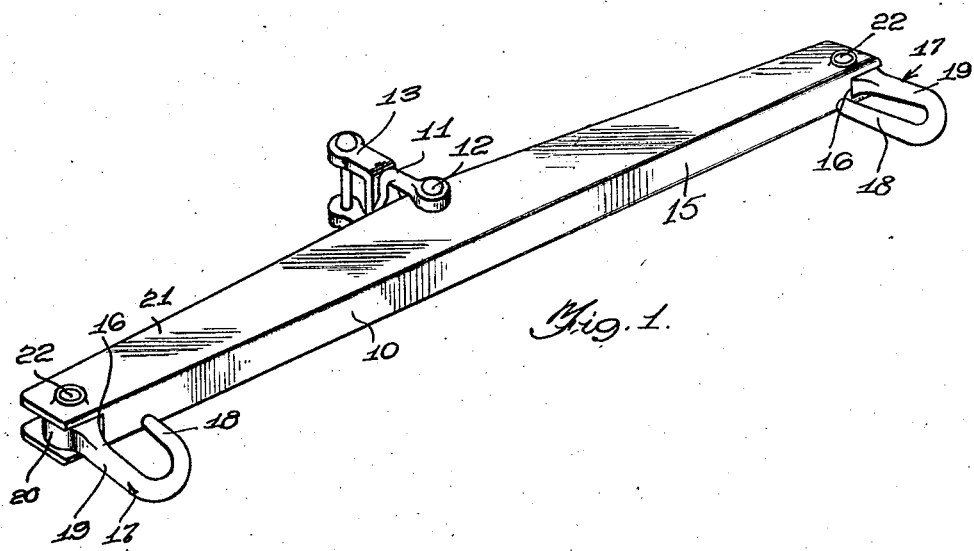
Figure 1 is a perspective view of a single tree embodying my invention.
Figure 2:
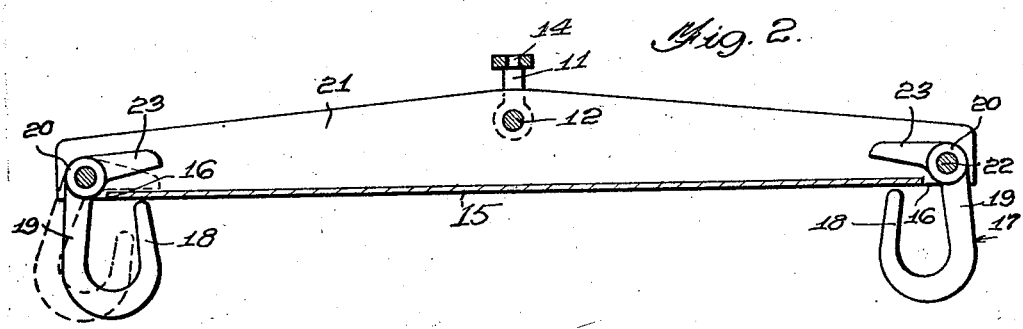
Figure 2 is a central longitudinal horizontal section through the same.
Figure 3:
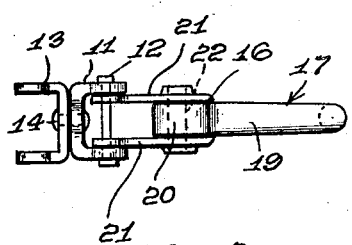
Figure 3 is an end elevation of the same.
Figure 4:
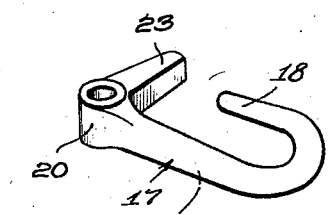
Figure 4 is a perspective view of the trace-hook.

In the drawings, wherein for the purpose of illustration is shown a preferred embodiment of my invention, the numeral 10 designates a single tree, preferably formed of sheet metal, and preferably U-shaped in cross section.

The numeral 11 designates a swiveled link or coupling element, which is U-shaped, and engages over the rear edge of the single tree, and is pivoted thereto by means of a bolt 12. The numeral 13 designates a clevis, which is attached to the forward end of a plow beam or the like, in the usual manner. This clevis has pivotal connection with the swivel or coupling element 11, as shown at 14.

The single tree is provided in its forward closed side 15, at the ends thereof, with openings or notches 16, for receiving portions of trace-hooks 17. These trace hooks are generally U-shaped and have their free end portions 18, arranged inwardly, with respect to the single tree, and adapted to be disposed in close relation to the side 15 of the single tree, or to contact therewith. The outer arms 19 of the trace-hooks are provided with apertured heads or hubs 20, positioned between the top and bottom sides 21 of the single tree, at the ends thereof and are pivotally connected with these sides by bolts 22 or the like. Formed integral with the heads or hubs are stop fingers or extensions 23, extending transversely of the arms 19, and projecting inwardly toward and beyond the inner free end portions 18 of the track-hooks. The fingers or extensions 23 are positioned inwardly within the single tree 10, and are adapted to engage the inner surface of the forward side 15. The function of these fingers or extensions is to limit the outward opening movement of the trace-hooks, as shown.

In operation, the usual rings or attaching elements carried by the traces, are passed over the inner free ends 18 of the trace-hooks 19, when these trace-hooks are shifted to the open position. When this is accomplished, the pull upon the traces causes the trace-hooks 19 to assume the normal active position, whereby the rings or the like can not pass from the trace-hooks. The free end portions 18 of the trace-hooks either contact with the side 15 of the single tree or are disposed in such close relation thereto that the traces can not become separated therefrom.

It is to be understood that the form of my invention, herewith shown and described, is to be taken as a preferred example of the same, and that various changes in the shape, size and arrangement of parts may be resorted to without departing from the spirit of my invention, or the scope of the subjoined claims.

Having thus described my invention, I claim:—

1. The combination with a hollow single tree, of trace-hooks directly pivotally mounted within the hollow single tree and having their free ends bent inwardly from the pivots whereby the pull upon the trace-hooks will cause their free ends to remain in close relation to the single-tree, and inwardly projecting stop fingers rigidly secured to the trace-hooks and arranged within the hollow single tree and adapted to engage with the wall of the same to limit the outward opening movement of the hooks.

2. The combination with a hollow single tree, having a forward wall, of U-shaped trace-hooks provided at their outer ends with openings, pivots extending through the single tree and through the openings in the outer ends of the trace-hooks, whereby the trace-hooks are dircetly pivotally mounted upon the ends of the single tree, the inner ends of the trace-hooks being positioned inwardly of the pivots whereby the pull on the trace-hooks will hold such free ends in close relation to the forward wall, and inwardly projecting stop fingers rigidly attached to the trace-hooks adjacent to the pivots and arranged within the hollow single tree to contact with the forward wall of the same when the trace-hooks are swung outwardly to the open position.

In testimony whereof I affix my signature.

MONROE S. BLACKBURN.